United States Patent [19]

Meyn et al.

[11] 4,418,445
[45] Dec. 6, 1983

[54] APPARATUS FOR CUTTING OPEN A FOWL BY A TRANSVERSE CUT

[75] Inventors: Pieter Meyn; Cornelis Meyn, both of Oostzaan, Netherlands

[73] Assignee: Meyn Machinefabriek BV, Oostzaan, Netherlands

[21] Appl. No.: 362,037

[22] Filed: Mar. 25, 1982

[30] Foreign Application Priority Data

Mar. 27, 1981 [NL] Netherlands .......... 8101527

[51] Int. Cl.³ .............. A22C 21/06
[52] U.S. Cl. .................. 17/11
[58] Field of Search ................. 17/11, 12

[56] References Cited

U.S. PATENT DOCUMENTS 3,188,212 6/1965 Koonz et al. .......... 17/11 X
4,059,868 11/1977 Meyn ................ 17/11

Primary Examiner—Willie G. Abercrombie
Attorney, Agent, or Firm—Julian W. Dority

[57] ABSTRACT

A revolving apparatus for automatically transversely cutting open fowl hanging by the ankle joints from an overhead conveyor, having a stationary cutting knife and a number of stretching members regularly spaced about the circumference of the apparatus. The stretching members work in succession as they revolve about the central shaft of the apparatus moving along with the conveyor. Each stretching member is vertically movable down towards a fowl carried by the conveyor and away again from the fowl. During the downward movement of a stretching member the same is inserted into an opening in the fowl previously made by cutting out its vent, whereafter the stretching member is moved radially outwardly to stretch the abdominal skin of the fowl from the inside radially outwardly towards the stationary knife which cuts the skin as the fowl passes the knife.

4 Claims, 2 Drawing Figures

APPARATUS FOR CUTTING OPEN A FOWL BY A TRANSVERSE CUT

BACKGROUND OF THE INVENTION

The invention relates to the processing of fowl and more particularly to an apparatus for opening the body cavity of a fowl by a transverse cut.

In the evisceration of fowl carcasses it is common practice to first cut out the vent by a circular cut in the abdominal skin and then to provide further access to the body cavity by cutting the abdominal skin. Usually, the cavity is thus opened by a longitudinal cut extending from the cut-out vent opening towards the breast-bone of the fowl. However, in some countries the fowl carcasses are preferably opened by a transverse cut which thus leaves a small strip of skin between the vent opening and the transverse cut. When the fowls are packed, the legs are inserted beneath this remaining strip of skin.

The U.S. Pat. No. 3,744,087 to Vertegaal discloses an apparatus for opening the body cavity of a fowl by such a transverse cut in which the fowl is moved through the apparatus hanging by the ankle joints from a hook of an overhead conveyor in the usual manner, the vent of the fowl having been previously cut out. In this known apparatus the cutting means for making the transverse cut comprises a rotating circular knife which makes a straight transverse cut in the abdominal skin of each passing fowl at a predetermined distance from the tail of the fowl. This known arrangement has the disadvantage that when making the cut it is difficult to prevent with certainty that the entrails lying underneath the skin are damaged by the rotating knife, which could cause contamination of the fowl carcass. This is caused by the fact that the skin is relatively loose and flabby making it necessary to press the knife firmly against the skin in order to stretch the latter and allow a cut to be made therein. If the cut is to be made not between the vent opening and the tail of the bird but between this opening and the breast-bone, the knife must be pressed so firmly to the skin that damage to the entrails is generally unavoidable. Another disadvantage of the known apparatus is that the cut is made at a fixed distance from the tail whereby for a small fowl the cut will be too close to the breast-bone and for a large fowl too close to the vent opening.

SUMMARY OF THE INVENTION

The invention has as its main object to provide an apparatus of the kind described which obviates the disadvantages of the above-discussed known apparatus and which allows to open the body cavity of a fowl by a transverse cut without any risk of damage to the entrails.

It is another object of the invention to provide such an apparatus which has a simple construction and is reliable in operation.

According to the invention this object is attained with an apparatus of the type referred to having stationary cutting means arranged in the path of the fowl as moved by the conveyor to which it is suspended, and a stretching member which is adapted to be inserted through the circular vent opening into the body cavity of the fowl and which is subsequently moved outwardly to slide under the abdominal skin of the fowl and thus to stretch this skin outwardly away from the underlying entrails and towards the cutting means. In this way the cutting means cannot damage the entrails while at the same time the stretched skin allows a sharp straight cut to be made therein. Furthermore, the transverse cut has a predetermined position with respect to the vent opening so that the remaining skin strip has always the same width.

Preferably the stretching member has a transverse groove for receiving the cutting means.

BRIEF DESCRIPTION OF THE DRAWINGS

Further features and advantages of the invention will become apparent from the following description of a preferred embodiment of the invention taken in connection with the accompanying drawings, in which.

DETAILED DESCRIPTION OF THE PREFERRED EMBODIMENT

Figure 1:
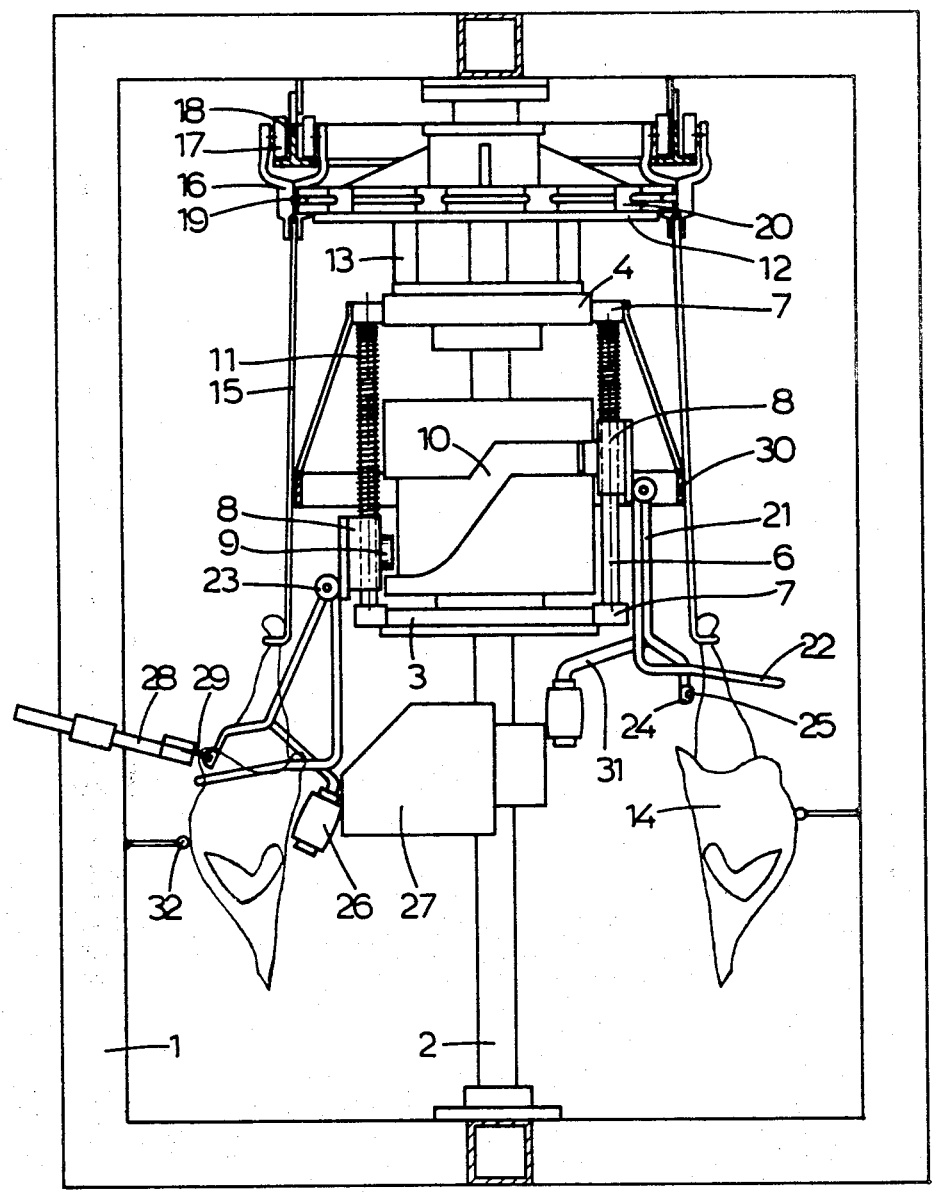
FIG. 1 is a side-view of an apparatus according to the invention.
Figure 2:
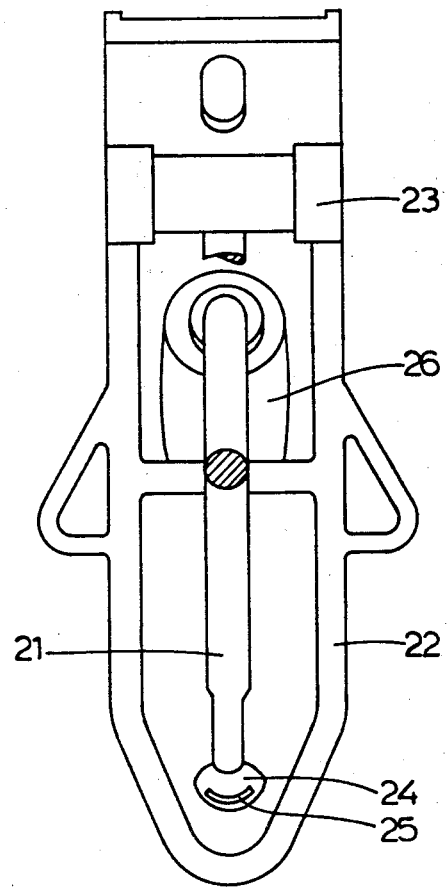
FIG. 2 is an enlarged plan-view of the stretching member of the apparatus of FIG. 1.

The apparatus shown in the drawings serves to cut open the body cavity of a fowl by a transverse cut which fowl is hanging by the ankle joints from a hook of an overhead conveyor. In a preceding processing station the vent of the fowl has been cut out in a conventional manner to sever the vent from the surrounding skin and to provide access into the body cavity of the fowl.

The apparatus comprises a frame 1 in which a vertical central shaft 2 is fixedly mounted. Two horizontally extending circular supports 3 and 4 are rotatably mounted on the shaft 2, one above the other. Between the supports 3 and 4 a plurality of vertical guide rods 6 are provided which rigidly interconnect the supports and which are secured in pairs to mounting blocks 7 regularly spaced about the circumference of the supports. On each pair of guide rods 6 a slide 8 is mounted for vertical reciprocating movement. Each slide 8 carries on its rearside facing the central shaft 2 a follower roller 9 which co-operates with a stationary camming track 10 secured to the shaft 2. Coil springs 11 are arranged on the guide rods 6 extending between the slide 8 and the upper support 4 so as to urge the slide downwardly. The shape of the camming track 10 is such that the slides 8 move up and down the guide rods 6 in the required manner (as discussed below) as the guide rods together with the supports 3 and 4 rotate about the central shaft 2.

The supports 3 and 4 with the guide rods 6 are driven by a horizontal driving wheel 12 rotatably mounted on the shaft 2 above the upper support 4, the driving wheel 12 being rigidly connected to the upper support 4 by means of connecting rods 13.

The fowl 14 to be cut open are supplied to the apparatus by an overhead conveyor having hooks 15 adapted to support a fowl 14 by the ankle joints. Each hook 15 is suspended from a shackle 16 having two rollers 17 supported by a rail 18. The shackles 16 of the conveyor are attached at regular intervals to a pulling cable or chain 19. A part of the rail 18 is concentric with the shaft 2 which rail part is supported by the frame 1 in a position above the driving wheel 12. The driving wheel 12 is provided with recesses 20 arranged at regular intervals in its circumferential edge, the spacing between successive recesses 20 corresponding with the distance between successive conveyor shackles 16 whereby the shackles 16 as they are moved along the rail 18 by the pulling cable 19 are received within the recesses 20 when they reach the apparatus and so rotate the driving wheel 12 about the central shaft 2.

Each slide 8 carries on its side facing away from the shaft 2 a stretching member 21 and a radially outwardly extending, generally U-shaped abutment member 22. The stretching member 21 is formed as a generally downwardly extending lever pivotally connected at its upper end to the slide 8 by horizontal hinge means allowing the stretching member 21 to be swung radially outwardly and upwardly. The lower end of the member 21 is formed with an enlargement 24 provided with a horizontally extending groove 25. The member 21 has been so shaped that in its vertically downwardly extending first or rest position, shown in the right-hand side of FIG. 1, the enlargement 24 is in a position allowing it to be inserted into the cavity of a fowl 14 suspended from a conveyor shackle 16. A follower roller 26 is secured to the member 21 by means of a radially inwardly extending connecting rod 31 which roller 26 co-operates with a stationary eccentric camming member 27 secured to the shaft 2 and having a vertically extending camming surface. In its rotational movement about the shaft 2 the stretching member 21 will thus be swung radially outwardly and upwardly from the first or rest position to a second or operating position, shown on the left of FIG. 1 by the follower roller 26 moving along the camming member 27.

The abutment member 22 is fixedly secured to the slide 8 and is adapted to grip the fowl between its legs on a downward movement of the slide 8 whereby the fowl is held against lateral swinging movement with respect to the conveyor. The fowl is further properly positioned by a circular guide rail 30 secured to the upper support 4 and serving as a guide for the hooks 15, and by a further guide rail 32 secured to the frame 1 and engaging the breast of the fowl 14.

Stationary cutting means are provided comprising a knife holder 28 adjustably secured to the frame 1 and extending inwardly therefrom, the knife holder 28 carrying a knife 29 in a position in which the knife may enter the groove 25 of the stretching member 21 in the second position of the latter.

The apparatus hereinbefore described operates as follows:

When a fowl 14 carried by the conveyor reaches the apparatus, the hook 15 from which the fowl 14 is hanging contacts the guide rail 30 and the abutment member 22 of one of the slides 8, which is in its uppermost position as shown at the right side of FIG. 1, is inserted between the legs of the fowl 14. The guide rail 32 engaging the breast of the fowl 14 holds the fowl in a position in which the vent opening cut therein lies straight below the enlargement 24 of the stretching member 21 which is in its lower or rest position. As the driving wheel 12 is rotated by the moving conveyor the slide 8 is moved downwardly on the guide rods 6 by the follower roller 9 in the camming track 10 whereby the enlargement 24 at the lower end of the stretching member 21 is inserted into the vent opening of the fowl. Next the follower roller 26 moving along the camming member 27 swings the stretching member 21 radially outwardly and upwardly whereby the enlargement 24 is slid under the abdominal skin of the fowl 14 so as to pull the skin upwardly and outwardly. In the lowermost position of the slide 8 and the outermost second position of the stretching member 21 (as shown at left in FIG. 1) the fowl passes the knife 29 which enters into the groove 25 of the enlargement 24 and thus makes a transverse cut in the skin of the fowl. The abutment member 22 is pressed against the guide of the fowl by the springs 11 and thus helps to tightly stretch the skin across the enlargement 24 of the stretching member 21 whereby the skin can be easily cut without the need of a rotating knife. Finally, the stretching member 21 is again swung inwardly and the slide 8 moved upwardly until the fowl is free from the members 21 and 22 whereupon the fowl 14 is removed from the apparatus by the conveyor. It will be clear that the length of the cut is determined by the size of the enlargement 24 and the depth of the groove 25. The length of the cut can be adjusted within a relatively small range by varying the depth of penetration of the knife 29 into the groove 25. In case a very long cut is desired, it is also possible to direct the knife immediately below the enlargement 24 instead of into the groove 25.

I claim:

1. Apparatus for opening the body cavity of a fowl by a transverse cut which fowl is hanging by the ankle joints from a hook of an overhead conveyor, the vent of which fowl having been previously cut out, said apparatus comprising
   a frame,
   cutting means carried by said frame in a stationary position with respect to said conveyor,
   at least one guide means movably connected to said frame,
   means for moving said guide means along with said conveyor,
   slide means vertically reciprocatably mounted on said guide means,
   means for moving said slide means along said guide means towards and away from a fowl carried by said conveyor,
   means carried by said slide means for engaging and holding the fowl in a position allowing it to be cut by said stationary cutting means as it is carried along by said conveyor in a pre-determined path of travel,
   said holding means comprising a stretching member movably connected to said slide means for reciprocating movements between a first position in which said stretching member can be inserted into the body cavity of the fowl through the vent opening cut out therein and a second position outwardly of said first position,
   means for moving said stretching member between said two positions in synchronisation with the movements of said slide means,
   whereby on the downward movement of the slide means the stretching member in its said first position is inserted into the fowl body cavity and then moved to its second position to stretch the skin of the fowl upwardly towards said stationary cutting means.

2. The apparatus of claim 1 in which said stretching member comprises a lever arm pivotally connected to said slide means, and an enlargement formed at the free end of said lever arm for engaging the skin of the fowl.

3. The apparatus of claim 2 in which said enlargement of said stretching member has a transverse groove for receiving said cutting means.

4. The apparatus of claim 1 in which said cutting means comprises a knife holder adjustably secured to said frame and a flat knife carried by said knife holder.

* * * * *